United States Patent [19]

Gamble et al.

[11] 4,253,425
[45] Mar. 3, 1981

[54] INTERNAL DUST RECIRCULATION SYSTEM FOR A FLUIDIZED BED HEAT EXCHANGER

[75] Inventors: Robert L. Gamble, Wayne; Juan A. Garcia-Mallol, Morristown, both of N.J.

[73] Assignee: Foster Wheeler Energy Corporation, Livingston, N.J.

[21] Appl. No.: 8,019

[22] Filed: Jan. 31, 1979

[51] Int. Cl.³ .............................................. F22B 1/02
[52] U.S. Cl. .............................. 122/4 D; 110/165 A; 110/245; 110/263
[58] Field of Search ............... 122/4 D; 110/245, 266, 110/165 A, 322, 309, 234, 310, 263

[56] References Cited

U.S. PATENT DOCUMENTS

| 1,970,109 | 8/1934 | Stratton | 122/165 A |
|---|---|---|---|
| 2,110,452 | 3/1938 | Moyer | 110/165 A |
| 2,232,290 | 2/1941 | Szikla et al. | 110/263 |
| 2,343,895 | 3/1944 | Frisch | 110/165 A |
| 2,582,830 | 1/1952 | Hawley | 110/309 |
| 2,994,287 | 8/1961 | Freiday | 110/322 |
| 3,080,855 | 3/1963 | Lewis | 122/4 D |
| 3,763,830 | 10/1973 | Robinson et al. | 110/215 |
| 3,893,426 | 7/1975 | Bryers | 110/245 |
| 3,902,462 | 9/1975 | Bryers | 110/245 |
| 4,184,455 | 1/1980 | Talmud et al. | 122/4 D |

Primary Examiner—Henry C. Yuen
Attorney, Agent, or Firm—Marvin A. Naigur; John E. Wilson; John J. Herguth, Jr.

[57] ABSTRACT

A fluidized bed heat exchanger in which air is passed through a bed of particulate material containing fuel disposed in a housing. A steam/water natural circulation system is provided in a heat exchange relation to the bed and includes a steam drum disposed adjacent the bed and a tube bank extending between the steam drum and a water drum. The tube bank is located in the path of the effluent gases exiting from the bed and a baffle system is provided to separate the solid particulate matter from the effluent gases. The particulate matter is collected and injected back into the fluidized bed.

10 Claims, 4 Drawing Figures

INTERNAL DUST RECIRCULATION SYSTEM FOR A FLUIDIZED BED HEAT EXCHANGER

BACKGROUND OF THE INVENTION

This invention relates to a fluidized bed heat exchanger and, more particularly, to such a heat exchanger in which effluent gases from the bed are passed over a plurality of heat exchange tubes to add heat to water flowing through the tubes.

The use of fluidized beds has long been recognized as an attractive means of generating heat. In these arrangements air is passed through a bed of particulate material which includes a mixture of inert material, a fuel material such as high sulfur, bituminous coal and, usually, adsorbent material for the sulfur released as a result of the combustion of the coal. As a result of the air passing through the bed, the bed is fluidized which promotes the combustion of the fuel. The basic advantages of such an arrangement are many and include a relatively high heat transfer rate, a substantially uniform bed temperature, combustion at relatively low temperatures, ease of handling the fuel materials, a reduction in corrosion and boiler fouling and a reduction in boiler size.

It has been suggested to provide a tube bank in connection with the above-described type of fluidized bed which tube bank normally extends between two drums for circulating water therebetween so that, when the mixture of the combustion gases from the fluidized bed and the excess air passing through the fluidized bed (with said mixture hereinafter being referred to as "effluent gases") is passed over the tube bank, heat from the effluent gases is added to the water in the tubes. However, in these type arrangements, a substantial amount of combustible matter and/or other reactant, in the form of solid dust-like particulate material is normally carried away as particles in the effluent gases. This presents problems especially in connection with the use of tube banks since the solid particulate material tends to collect on and build up on the tubes causing erosion and a reduction in efficiency.

Although it has been suggested to separate this particulate material from the effluent gases, it is often done by external cyclone separators, or the like, which, in addition to being relatively expensive, must be located externally of the heat exchanger thus requiring a system for discharging the effluent gases externally of the heat exchanger and to the cyclone separator.

SUMMARY OF THE INVENTION

It is therefore an object of the present invention to provide a fluidized bed heat exchanger which includes an internal system for separating the solid particulate material from the effluent gases.

It is a further object of the present invention to provide a heat exchanger of the above type in which the above-mentioned separation is carried out by relatively inexpensive structural additions to the system.

It is a still further object of the present invention to provide a heat exchanger of the above type in which the separated solid particulate material is collected and reinjected back into the fluidized bed.

Toward the fulfillment of these and other objects the system of the present invention comprises a bed of particulate material containing fuel disposed in a housing with air being passed through the bed to fluidize the material and promote the combustion of the fuel. A water circulation system is located in the housing adjacent the bed and includes a series of water circulation tubes connected to at least one drum. The effluent gases from the bed are directed over the tubes to add heat to the water in the tubes. A baffle system is located in the path of the gases as the gases pass from the bed and across the tubes for separating the solid particulate material from the gases. A hopper is provided adjacent the fluidized bed for collecting the separated particulate material, and an injector is provided for injecting the separated particulate material back into the bed.

BRIEF DESCRIPTION OF THE DRAWINGS

The above description, as well as further objects, features, and advantages of the present invention, will be more fully appreciated by reference to the following description of a presently-preferred but nonetheless illustrative embodiment in accordance with the present invention, when taken in connection with the accompanying drawings wherein.

DESCRIPTION OF THE PREFERRED EMBODIMENTS

Figure 1:
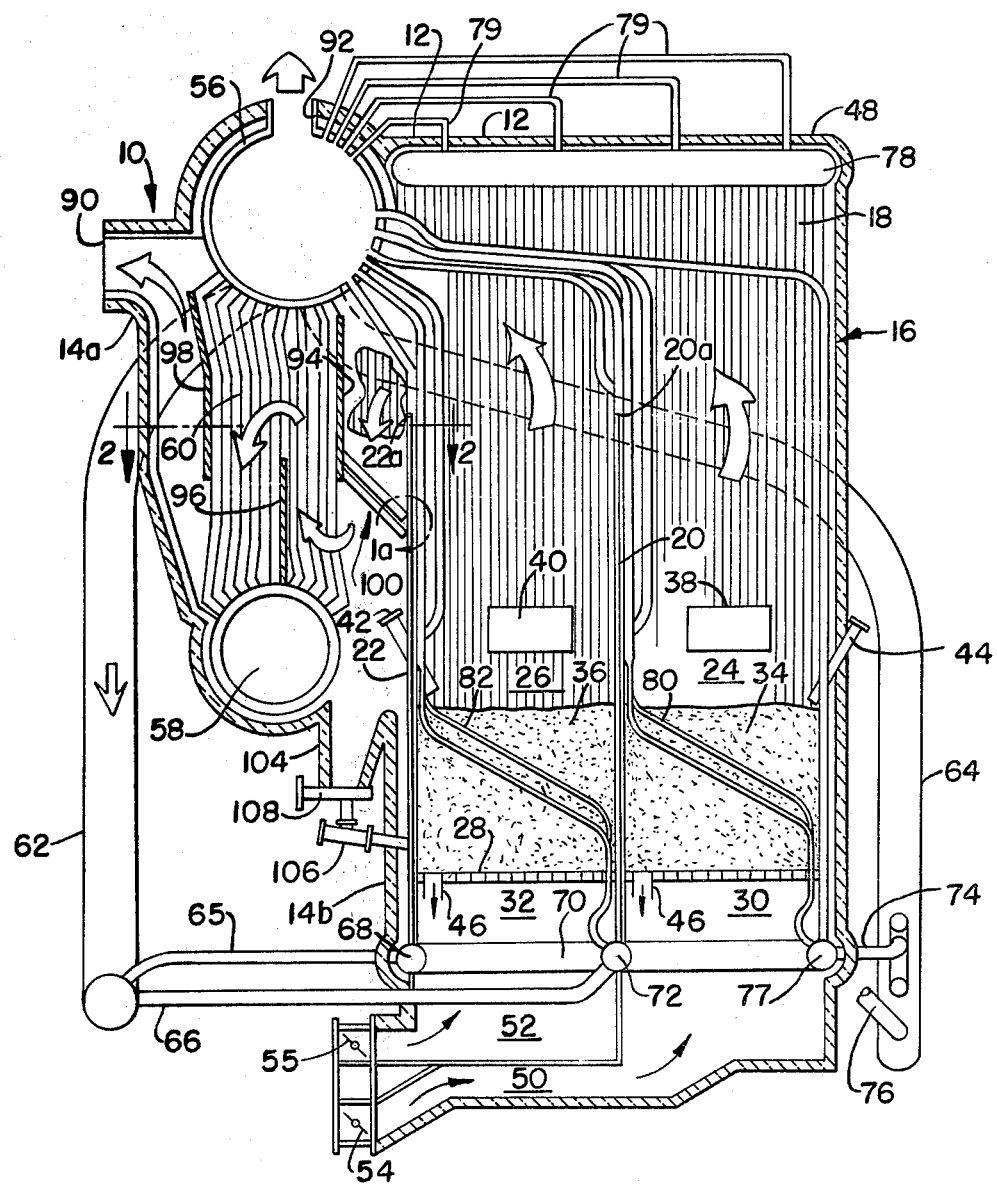
FIG. 1 is a schematic cross-sectional view of the heat exchanger of the present invention.

Referring specifically to FIG. 1 of the drawings the reference numeral 10 refers in general to the fluidized bed heat exchanger of the present invention which, for the purposes of example, is shown in the form of a steam generator. The generator includes an outer vessel having a top wall or roof 12, an upper front wall 14a, a lower front wall 14b, a rear wall 16, and two sidewalls, one of which is shown by the reference numeral 18.

A pair of spaced partition walls 20 and 22 extend parallel to the rear wall 16 and between the sidewalls 18 to define two chambers 24 and 26. A horizontally extending air distribution plate 28 extends between the partition wall 22 and the rear wall 16, between the two sidewalls 18 near the lower portion of each chamber 24 and 26, and in a spaced relation to the floor of the vessel to define air distribution chambers 30 and 32, respectively, Two beds of particulate material, shown in general by the reference numerals 34 and 36, are disposed in the chambers 24 and 26, respectively and are supported by the plate 28. Each bed of particulate material includes a mixture of crushed coal and an inert material such as commercial grade hematite iron ore. Also, a fine limestone or dolomite may be included for use as an adsorbent for the sulfur released during the combustion of the fuel, in a conventional manner.

Two spreader coal feeders 38 and 40 are mounted to one sidewall 18 for introducing the crushed coal into the beds 34 and 36, respectively, while a limestone feed pipe 42 is mounted in the wall 16 for introducing the limestone into the bed 36 and a limestone feed pipe 44 is mounted through the wall 22 for introducing limestone into the bed 34. A drain 46 is provided for each of the beds 34 and 36 and extends through the plate 28 for permitting the spent particulate material to discharge from the bed as will be described in detail later.

Figure 2:
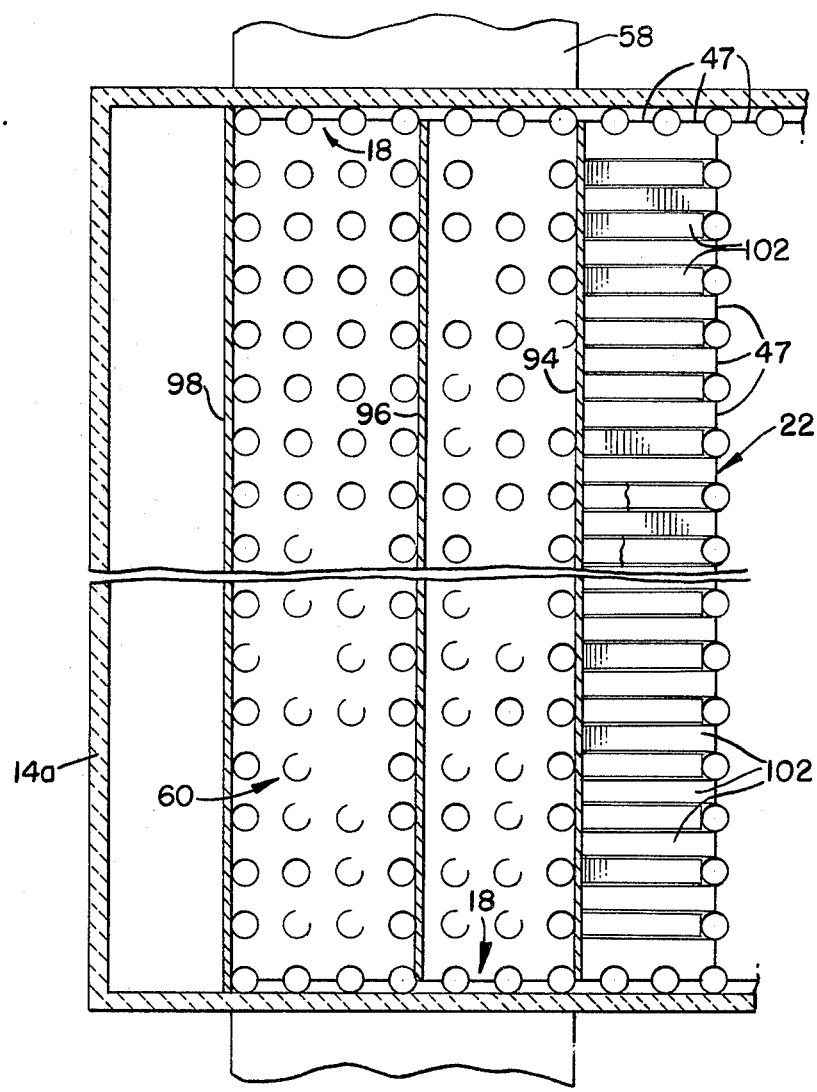
FIG. 2 is a cross-sectional view taken along the line 2—2 of FIG. 1.

As also shown with reference to FIG. 2, each of the walls 18 and 22 are formed by a plurality of tubes having two longitudinally extending fins 47 connected to diametrically opposite portions thereof with the fins of adjacent tubes being welded together to form a gas-tight structure. Although not shown in FIG. 2, it is understood that the walls 16 and 20 are formed in an identical manner. As shown in FIG. 1, an outer layer of insulating material 48 extends around and encloses the rear wall 16 and the sidewalls 18 and also forms the roof 12 and the upper and lower front walls 14a and 14b of the vessel.

Two air distribution ducts 50 and 52 are disposed immediately below the air distribution chambers 30 and 32, respectively, for distributing air to the latter chambers and into the beds 34 and 36, respectively. The air flows through the ducts 50 and 52 under the control of dampers 54 and 55, respectively, located in the ducts and then upwardly through the chambers 30 and 32 and the plate 28 to fluidize the beds 34 and 36 and promote the combustion of the particulate fuel material. The air, after passing through the beds 34 and 36 and taking part in the combustion reactions combines with the gaseous products of combustion and exits outwardly from the chambers 24 and 26, respectively, in a manner to be described in detail later.

A water/steam circulation system is provided between the partition wall 22 and the upper front wall 14a and includes an upper steam drum 56 and a lower water, or mud, drum 58. A boiler bank 60 is also provided and consists of a multiplicity of spaced tubes connecting the steam drum 56 and the water drum 58 to place them in fluid communication. The steam drum 56 is supported by external support structure (not shown) and the water drum 58 is supported by the steam drum through the boiler bank 60.

Two pairs of downcomers 62 and 64 extend downwardly from the steam drum 56, with one downcomer of each pair being shown in FIG. 1. The downcomer 62 is connected to a series of horizontal feed pipes 65 and 66 located at the lower portion of the vessel with one feed pipe of each series being shown in FIG. 1. The feed pipes 65 are connected in fluid communication with two horizontal headers 68 and 70 which, in turn, are connected in fluid communication with the lower ends of the tubes forming the partition wall 22 and the front half of sidewalls 18, respectively. In a similar manner, the feed pipes 66 are connected to a horizontal header 72 which is connected in flow communication with the lower ends of the tubes forming the partition wall 20. The downcomers 64 are connected to a series of feed pipes 74 and 76, one of each of which are shown in FIG. 1, with the feed pipes 74 being connected in fluid communication with a header 77 which, in turn, is connected to the lower ends of the tubes forming the rear wall 16. Although not clear from the drawings it is understood that the feed pipes 76 are connected to a header (not shown) which is in fluid communication with the lower ends of the tubes forming the rear half of sidewalls 18.

An upper header 78, located adjacent the roof 12 is connected to the upper ends of the tubes forming the sidewalls 18 shown in FIG. 1 for receiving the fluid from the latter. A plurality of riser tubes 79 are connected between the header 78 and the steam drum 56 for passing the fluid back to the steam drum. It is understood that another header similar to header 78 is provided in connection with the tubes forming the other sidewall 18 and is connected, via additional tubes, to the steam drum 56.

Referring again to FIG. 1, the upper portions of the tubes forming the walls 16, 20, and 22 are bent into a horizontal configuration as shown and are connected to the steam drum 56 to complete the flow circuit. In this respect it is noted that the finned portions of the tubes forming the walls 20 and 22 terminate at points shown by the reference numerals 20a and 22a, respectively, but that the tubes forming these walls continue upwardly and are bent over as shown for connection to the steam drum 56. As a result, the air and gaseous products of combustion from the beds 34 and 36 can pass through the spaces thus defined between the upper portions of the tubes forming the walls 20 and 22, as they exit from the chambers 24 and 26, respectively, as will be described in detail later.

An additional circuit for the passage of the water and steam is provided by two series of bed tubes 80 and 82 which are connected at their lower ends to the headers 77 and 72, respectively, and which pass upwardly in a substantially vertical manner through the air distribution chambers 30 and 32, and into the lower portions of the beds 34 and 36, respectively. The bed tubes 80 and 82 are then bent at an angle to the upper surface of the beds 34 and 36, respectively, and extend diagonally across the beds whereby they are bent again to extend vertically upwardly through the remaining portions of the chambers 24 and 26, respectively, before they are bent again into a substantially horizontal configuration for connection to the steam drum 56.

A gas outlet 90 is provided in the upper front wall 14a for the discharge of the air and gaseous products of combustion from the chambers 24 and 26. In passing from the latter chambers the air and gaseous products of combustion pass over the boiler bank 60 to add heat to the water/steam in the tubes forming the boiler bank as will be described in detail later. A steam outlet 92 is provided in the steam drum 56 for providing for the discharge of the steam to another unit, such as a steam turbine, or the like.

As shown in FIG. 1, three baffles 94, 96, and 98 are mounted to several tubes forming the tube bank 60. The baffles extend for the complete width of the housing 10 in a direction perpendicular to the plane of the drawing and can be welded or otherwise attached to the tubes. Baffle 94 is mounted on the rear row of tubes immediately adjacent the fluidized beds while the baffle 98 is mounted on the front row of tubes and the baffle 96 is mounted on an intermediate row of tubes. The baffle 96 is spaced downwardly from the baffles 94 and 98 and extends upwardly from the drum 58.

Figure 1A:
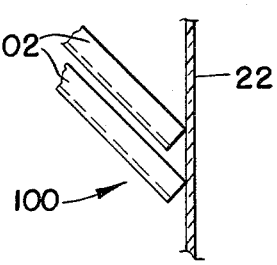
FIG. 1A is an enlarged view of that portion of the structure in FIG. 1 included within the circle 1A.
Figure 3:
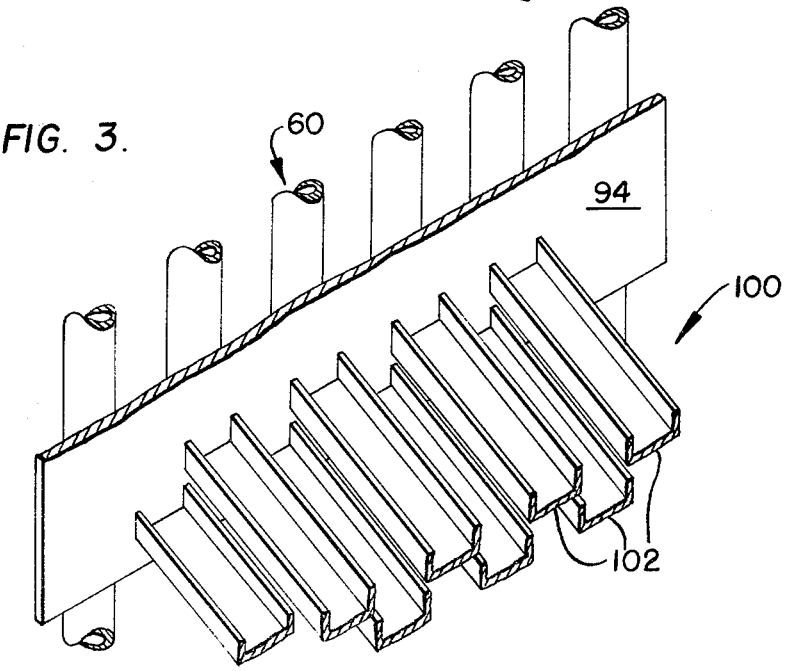
FIG. 3 is an enlarged partial perspective view of a portion of the components shown in FIG. 1.

An additional baffle system 100 is shown in general in FIG. 1 and specifically with respect to FIGS. 1A, 2, and 3. In particular, the baffle system 100 consists of a plurality of parallel elongated members in the form of channel steel beams 102 that extend from the lower portion of the baffle 94 and angularly downwardly to the partition wall 22. As better shown in FIG. 3, alternate beams 102 are spaced slightly upwardly from their two adjacent beams to form relatively small spaces for the passage of gases. The beams 102 are substantially U-shaped in cross section and as such will collect dust from the gases as the latter impinges against their upper surfaces in a manner to be described in detail later.

Referring again to FIG. 1, a hopper 104 is formed adjacent the lower front wall 14b of the housing 10 and collects the separated particulate material from the baffle system 100. A pneumatic assisted injector 106 is provided immediately below the hopper 104 and receives the particulate material from the hopper when knife valve 108 is open. The injector 106 communicates with the lower portion of the fluidized bed in the chamber 26 and operates to inject the particulate material into the latter bed. Since the injector 106 and the valve 108 operate in a conventional manner they will not be described in any further detail.

In operation, the particulate fuel material in the beds 34 and 36 is ignited by ignitors, or the like, (not shown) disposed in an ignition zone at the ends of the beds, in a conventional manner. Air is passed through the air ducts 50 and 52 under control of the dampers 54 and 55 into the air distribution chambers 30 and 32, respectively, for passage upwardly through the plate 28 and into the beds 34 and 36, respectively, to fluidize the particulate bed material and promote the combustion of the fuel material. The excess air passing through the beds combines with the gaseous products of the combustion of the fuel material and flows upwardly into the upper portions of the chambers 24 and 26 before exiting from the chambers and into the area containing the boiler bank 60, the baffles 94, 96, and 98 and the baffle system 100.

A large portion of these effluent gases will initially impinge against either the baffle 94 or the beams 102 of the baffle system 100 causing the particulate material carried by the gases to separate therefrom and fall by gravity from the ends of the beams 102 and through the spaces defined by the beams and into the hopper 104. After passing through the baffle system 100, the gases will then pass to the left as viewed in FIG. 1 and upwardly in the direction shown by the arrow between baffles 94 and 96. The gases then continue to pass in the direction indicated by the arrow over the top of baffle 96 and down between baffles 96 and 98. The gases then turn up and exit the vessel via the outlet 90. The separated particulate material collected in the hopper 104 is introduced to the pneumatic injector 106 by passing through the knife valve 108 and is injected by the injector into the lower portion of the chamber 26 as needed for further use in the combustion process.

Water is circulated from the steam drum 56 through the boiler bank 60 into the water drum 58 and back to the steam drum 56 and, from the downcomers 62 and 64 to the bed tubes 80 and 82 and the tubes forming the walls 16, 18, 20, and 22, as described previously. The heat generated by the fluidized beds 34 and 36 is added to the water flowing through the bed tubes 80 and 82 and the walls 16, 18, 20 and 22 disposed in the chambers 24 and 26 and particularly those portions thereof immersed in the fluidized beds 34 and 36 and the hot effluent gases passing in a sinuous path over the boiler bank 60 in the foregoing manner add additional heat to the water passing through the tubes of the latter. As a result, a portion of the water is converted to steam with the water/steam mixture rising in the tubes by natural convection and passing back into the steam drum 56. It is understood that the steam drum 56 may be provided with separators to separate the steam from the water in a conventional manner before the steam exits from the steam outlet 92. The portion of the water that is not converted to steam will recirculate in the foregoing manner and additional feed water is supplied to the drum 56 through an inlet (not shown) to replenish the water that is converted to steam.

The advantages of the foregoing arrangement are numerous. The use of the baffle system 100 enables the particulate material to be separated from the effluent gases in an inexpensive, simple and efficient manner with a minimum of structural additions to the heat exchanger. Also, this avoids a buildup of the particles, especially those having a relatively high momentum, on the outer surfaces of the tubes in the boiler back 60 and thus protects the tubes against erosion. Further, the separated particulate material is collected in a relatively simple manner and enables the latter material to be easily injected back into a fluidized bed which, of course, further increases the efficiency of the operation.

It is understood that several variations may be made in the foregoing without departing from the scope of the invention. For example, the present invention has been described in connection with a particular heat exchanger only for the purposes example, it being understood that it can be used in other applications consistent with the foregoing.

Also, the particular design of the baffles 94, 96, and 98 can be varied without departing from the scope of the invention. For example, rather than being in the form of solid partitions, the baffles 94, 96, and 98 can be formed by forming fins on the particular tubes in the particular location shown and connecting the fins of adjacent tubes together to form the baffles.

Other latitudes of modification, change and substitution are intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A heat exchanger comprising a housing, means establishing at least one bed of particulate material containing fuel in said housing, means for passing air through said bed to fluidize said material and promote the combustion of said fuel, a water circulation system located in said housing and adjacent said bed and including a series of water circulation tubes connected to at least one drum, means to direct the effluent gases from said fluidized bed over said tubes to add heat to the water in said tubes, baffle means disposed in said housing and located in the path of said gases as said gases pass from said bed and across said tubes for separating the solid particulate material from said gases, said baffle means comprising a plurality of elongated members extending between said tubes and said bed, said members being spaced apart to permit said gases to pass therebetween, means located in said housing and adjacent said bed for collecting the separated particulate material, and means for injecting said separated particulate material back into said bed.

2. The heat exchanger of claim 1, further comprising outlet means associated with said housing for said gases to discharge from said housing.

3. The heat exchanger of claim 1, wherein said baffle means further comprises at least one partition disposed across said tube bank.

4. The heat exchanger of claim 1, wherein said baffle means further comprises a plurality of fins formed on said tubes, with the fins of adjacent tubes being connected together.

5. The heat exchanger of claims 1, 3, or 4, wherein said baffle means further comprises three individual baffles disposed across said tube bank, said baffles being spaced apart and disposed in a manner to direct said gases in a sinuous path across said tube bank.

6. The heat exchanger of claims 1, 3 or 4, wherein said elongated members comprise channel beams.

7. The heat exchanger of claim 6, wherein said collection means comprises a hopper located below said channel beams.

8. The heat exchanger of claim 7, wherein said injecting means comprises an injector located below said hopper and valve for feeding said separated particulate material from said hopper to said injecting means.

9. The heat exchanger of claim 1, wherein said baffle means is adapted to direct said gases in a sinuous path across said tubes.

10. A heat exchanger comprising a housing, means establishing at least one bed of particulate material containing fuel in said housing, means for passing air through said bed to fluidize said material and promote the combustion of said fuel, a water circulation system located in said housing and adjacent said bed and including a series of water circulation tubes connected to at least one drum, means to direct the effluent gases from said fluidized bed over said tubes to add heat to the water in said tubes, baffle means disposed in said housing and located in the path of said gases as said gases pass from said bed and across said tubes for separating the solid particulate materials from said gases, said baffle means comprising a plurality of fins formed on said tubes, with the fins of adjacent tubes being connected together, means located in said housing and adjacent said bed for collecting the separated particulate material, and means for injecting said separated particulate material back into said bed.

* * * * *